(12) United States Patent
Trinkner et al.

(10) Patent No.: US 8,555,625 B2
(45) Date of Patent: Oct. 15, 2013

(54) EXHAUST SYSTEM FOR FIREFIGHTING VEHICLE

(75) Inventors: Chad M. Trinkner, Neenah, WI (US); Andrew J. Fochs, Appleton, WI (US); Richard J. Coenen, Shiocton, WI (US)

(73) Assignee: Pierce Manufacturing Company, Appleton, WI (US)

( * ) Notice: Subject to any disclaimer, the term of this patent is extended or adjusted under 35 U.S.C. 154(b) by 575 days.

(21) Appl. No.: 12/618,547

(22) Filed: Nov. 13, 2009

(65) Prior Publication Data

US 2011/0113760 A1    May 19, 2011

(51) Int. Cl.
F01N 3/00    (2006.01)
F01N 3/02    (2006.01)
A62C 27/00    (2006.01)
A62C 3/07    (2006.01)
A62C 3/08    (2006.01)
A62C 35/00    (2006.01)

(52) U.S. Cl.
USPC .............. 60/311; 60/301; 169/24; 169/62

(58) Field of Classification Search
USPC .......... 60/295, 297, 301, 311; 169/24, 52, 62; 180/89.2; D12/159
See application file for complete search history.

(56) References Cited

U.S. PATENT DOCUMENTS

| | | | |
|---|---|---|---|
| 4,264,344 A * | 4/1981 | Ludecke et al. ............... 55/313 |
| 5,535,708 A | 7/1996 | Valentine | |
| 6,826,906 B2 | 12/2004 | Kakwani et al. | |
| 6,871,489 B2 | 3/2005 | Tumati et al. | |
| 6,928,806 B2 | 8/2005 | Tennison et al. | |
| 7,062,904 B1 | 6/2006 | Hu et al. | |
| 2007/0042495 A1 | 2/2007 | Pavlova-MacKinnon et al. |
| 2007/0051096 A1 | 3/2007 | Pfeifer et al. | |
| 2007/0284156 A1* | 12/2007 | Grady et al. ............... 180/53.8 |
| 2007/0286736 A1* | 12/2007 | Grady et al. ............... 417/34 |
| 2007/0295824 A1* | 12/2007 | Bradley et al. ........... 237/12.3 A |
| 2008/0022662 A1 | 1/2008 | Yan | |
| 2008/0034739 A1 | 2/2008 | Ranalli | |
| 2008/0053737 A1* | 3/2008 | Cerri ........................... 180/309 |
| 2009/0084096 A1* | 4/2009 | Branning et al. ........... 60/311 |

(Continued)

FOREIGN PATENT DOCUMENTS

JP    2007040224 A  *  2/2007
JP    2009078591 A  *  4/2009

OTHER PUBLICATIONS

Fujita, Machine Translation of JP 2009-078591 A, Apr. 16, 2009.*

(Continued)

Primary Examiner — Kenneth Bomberg
Assistant Examiner — Audrey K Bradley
(74) Attorney, Agent, or Firm — Foley & Lardner LLP

(57) ABSTRACT

An after treatment exhaust system is provided. The after treatment exhaust system includes a diesel particulate filter configured to be supported at a first lateral side of a vehicle chassis and a selective catalytic reduction device configured to be supported at a second lateral side of the vehicle chassis opposite the first lateral side. The after treatment exhaust system also includes a first conduit configured to be in fluid communication between an engine and the diesel particulate filter, a second conduit configured to be in fluid communication between the diesel particulate filter and the selective catalytic reduction device and a third conduit having a first end coupled to the selective catalytic reduction device and at least one second end configured to be open to the environment.

15 Claims, 9 Drawing Sheets

(56) References Cited

U.S. PATENT DOCUMENTS

| | | | |
|---|---|---|---|
| 2009/0293467 A1* | 12/2009 | Boeckenhoff | 60/324 |
| 2010/0107612 A1* | 5/2010 | Yamazaki et al. | 60/295 |
| 2010/0132333 A1* | 6/2010 | Endo et al. | 60/285 |
| 2011/0041485 A1* | 2/2011 | Kimura | 60/297 |

OTHER PUBLICATIONS

Fujita et al., English Abstract of JP 2007-040224 A, Feb. 15, 2007.*

Promotional Materials Entitled "BlueTec", printed from website http://www.detroitdiesel.com, on Feb. 11, 2010 (8 sheets).

Promotional Materials Entitled "Cummins Aftertreatment System", printed from website http://www.everytime.cummins.com, on Feb. 11, 2010 (2 sheets).

Promotional Materials entitled "Diesel Exhaust Fluid (DEF)", printed from website http://www.everytime.cummins.com, on Feb. 11, 2010 (4 sheets).

Promotional Materials Entitled "The Truth About SCR", printed from website http://www.detroitdiesel.com, on Feb. 11, 2010 (6 sheets).

* cited by examiner

EXHAUST SYSTEM FOR FIREFIGHTING VEHICLE

BACKGROUND

The present disclosure relates generally to an exhaust system suitable for use with an internal combustion engine. More specifically, the present disclosure relates to an exhaust system suitable for use within a firefighting vehicle that is configured to pump or otherwise deliver a firefighting agent or suppressant (e.g., water, foam, etc.) to an area of interest.

Internal combustion engines, such as diesel engines and gasoline engines, emit a mixture of air pollutants during operation. These air pollutants are composed of gaseous compounds such as nitrogen oxides and solid particulate matter (e.g., soot, etc.). Due to increased awareness of the environment, exhaust emission standards have become more stringent, and the amount of gaseous compounds and solid particulate matter emitted to the atmosphere by an engine may be regulated depending on the type of engine, size of engine, and/or class of engine.

Exhaust systems have been developed to reduce such pollutants. However, such exhaust systems take up space within a vehicle. For vehicles such as firefighting vehicles, wherein available space within the vehicle is limited due the fire pumps, storage compartments, fluid tanks, ladders, etc., many complexities are encountered when attempting to incorporate an exhaust system in the vehicle.

SUMMARY

One embodiment of the invention relates to an after treatment exhaust system including a diesel particulate filter configured to be supported at a first lateral side of a vehicle chassis and a selective catalytic reduction device configured to be supported at a second lateral side of the vehicle chassis opposite the first lateral side The after treatment exhaust system also includes a first conduit configured to be in fluid communication between an engine and the diesel particulate filter, a second conduit configured to be in fluid communication between the diesel particulate filter and the selective catalytic reduction device and a third conduit having a first end coupled to the selective catalytic reduction device and at least one second end configured to be open to the environment.

Another embodiment of the invention relates to a vehicle including a chassis, an engine supported at the chassis and an exhaust system coupled to the engine. The exhaust system includes a diesel particulate filter supported at a first lateral side of the chassis, a selective catalytic reduction device supported at a second lateral side of the chassis opposite the first lateral side, a first conduit configured to be in fluid communication between the engine and the diesel particulate filter, a second conduit configured to be in fluid communication between the diesel particulate filter and the selective catalytic reduction device and a third conduit having a first end coupled to the selective catalytic reduction device and at least one second end configured to be open to the environment.

Another embodiment of the invention relates to a firefighting vehicle including a chassis including a first frame rail and a second frame rail. The first frame rail and the second frame rail are spaced apart from each other in a lateral direction to provide a cavity. The firefighting vehicle also includes an engine supported at least partially within the cavity and an exhaust system coupled to the engine. The exhaust system includes a diesel particulate filter supported at the first frame rail and a selective catalytic reduction device supported at the second frame rail.

DETAILED DESCRIPTION

Figure 1:
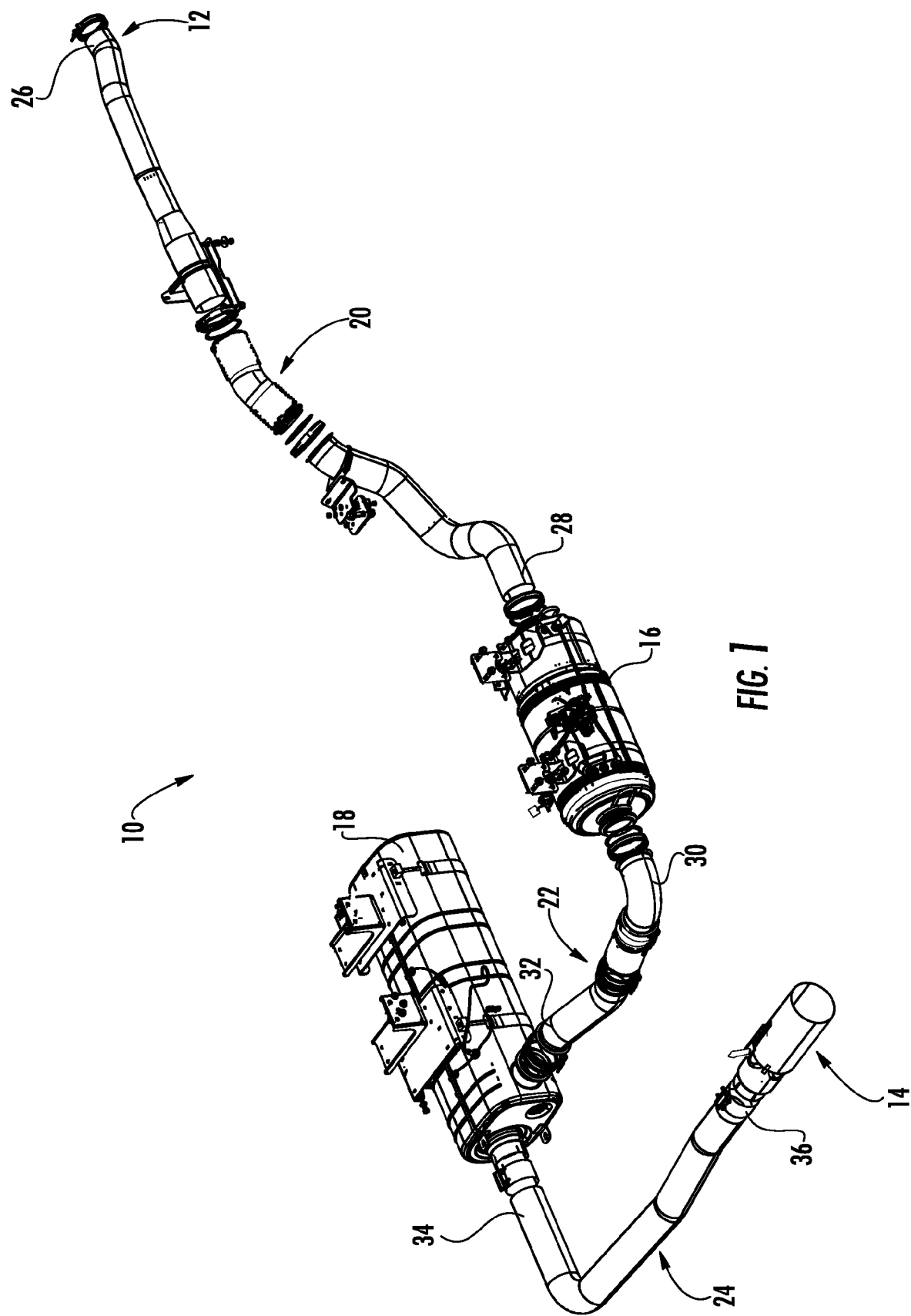
FIG. 1 is an exploded view of an after treatment exhaust system according to an exemplary embodiment.
Figure 2:
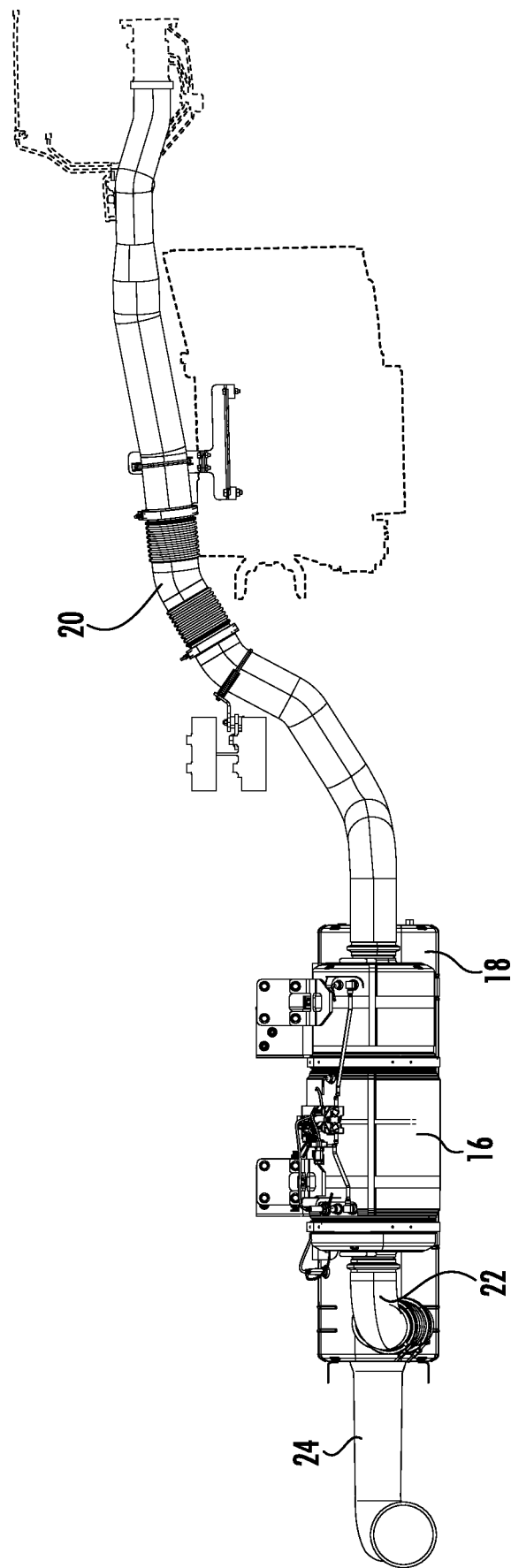
FIG. 2 is a side elevation view of the after treatment exhaust system of FIG. 1.

Referring to the FIGS. 1 and 2, an exhaust treatment system 10 and components thereof are shown according to an exemplary embodiment. Exhaust treatment system 10 includes an exhaust inlet 12 configured to be coupled to an internal combustion engine and an exhaust outlet 14 configured to be open to the environment. According to an exemplary embodiment, exhaust treatment system 10 is suitable for treating exhaust gas from a diesel engine. Exhaust gas, such as from a diesel engine of a fire fighting vehicle, enters exhaust treatment system 10 at exhaust inlet 12 and exits at exhaust outlet 14.

Between exhaust inlet 12 and exhaust outlet 14 there is an exhaust flow path that includes various exhaust processing and/or treatment components. For example, exhaust treatment system 10 includes a first exhaust treatment device (e.g., a mechanical treatment device, etc.), shown as a diesel particulate filter (DPF) device 16, and a second exhaust treatment device (e.g., a chemical treatment device, etc.), shown as a selective catalytic reduction converter (SCR) device 18. DPF device 16 is employed to remove particulate matter from engine exhaust, while SCR device 18 is employed to chemically alter the chemical structure of gaseous emissions using a catalyst that retains at least a portion of the noxious emissions as a non-gaseous product of the chemical reaction. According to the embodiment illustrated, DPF device 16 is located upstream relative to SCR device 18 in the exhaust flow path. As such, exhaust passes through the DPF device 16 before entering the SCR device 18. Exhaust treatment system 10 may also include a receptacle or chamber for retaining a reductant, such as an urea, which is injected into the exhaust gas stream before passing through the functional portion of SCR device 18.

Still referring to FIGS. 1 and 2, the exhaust flow path is at least partially defined by one or more conduits and/or fittings that direct the exhaust gas from the engine, through DPF device 16 and SCR device 18, and out to the environment. For example, according to the embodiment illustrated, exhaust treatment system 10 includes a first conduit 20, a second conduit 22 and a third conduit 24. First conduit 20 includes a first end 26 configured to be coupled to an engine and a second end 28 configured to be coupled to an inlet of DPF device 16. Second conduit includes a first end 30 configured to be coupled to an outlet of the DPF device 16 and a second end 32 configured to be coupled to an inlet of SCR device 18. Third conduit 24 includes a first end 34 configured to be coupled to an outlet of the SCR device 18 and a second end 36 configured to be coupled to a tail pipe. First conduit 20, second conduit 22 and/or third conduit 24 may include any of a number of sections of pipe and/or fittings depending on the particular application.

Figure 3:
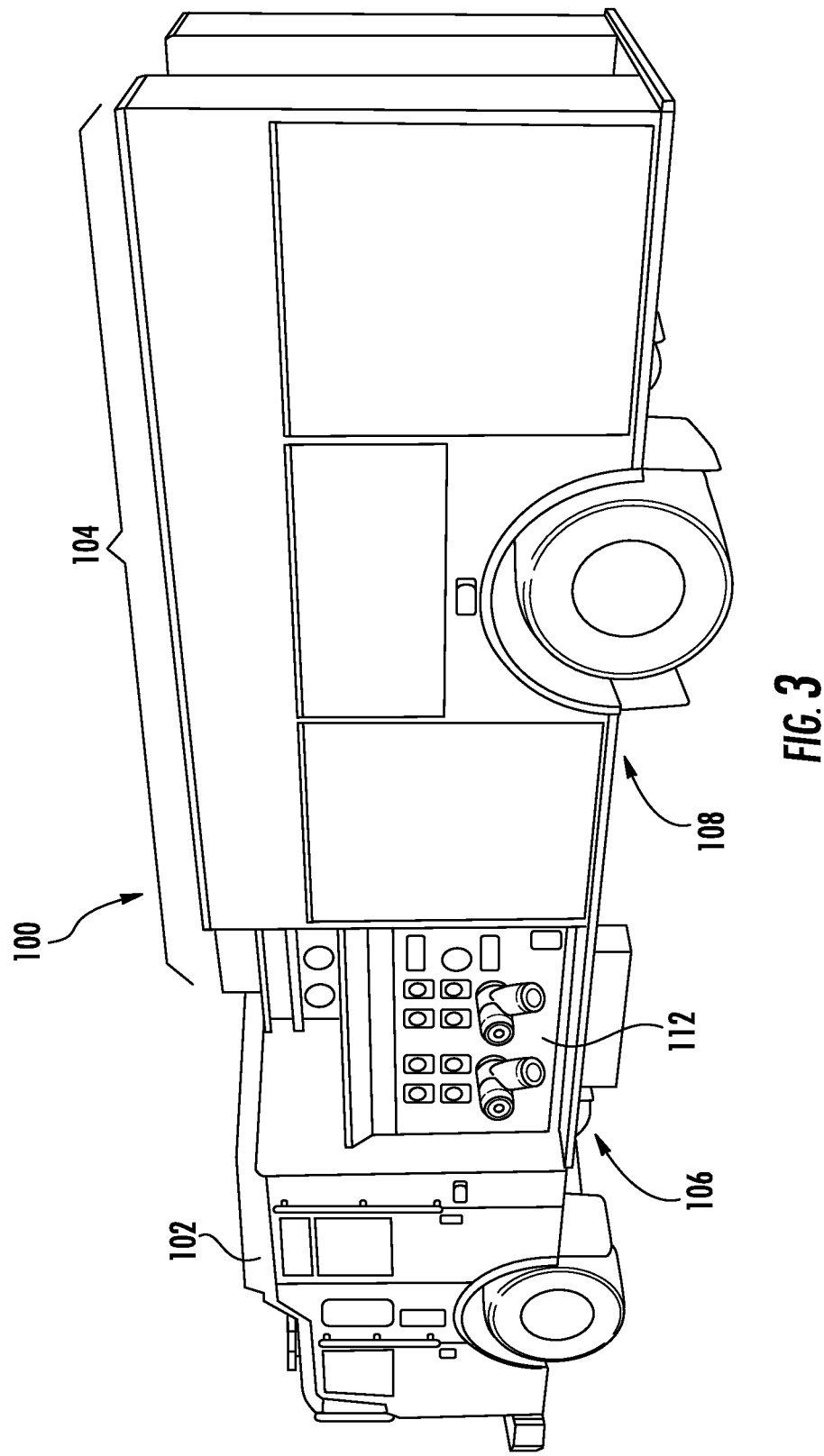
FIG. 3 is a left side isometric view of a firefighting vehicle according to an exemplary embodiment that includes the after treatment exhaust system of FIG. 1.
Figure 4:
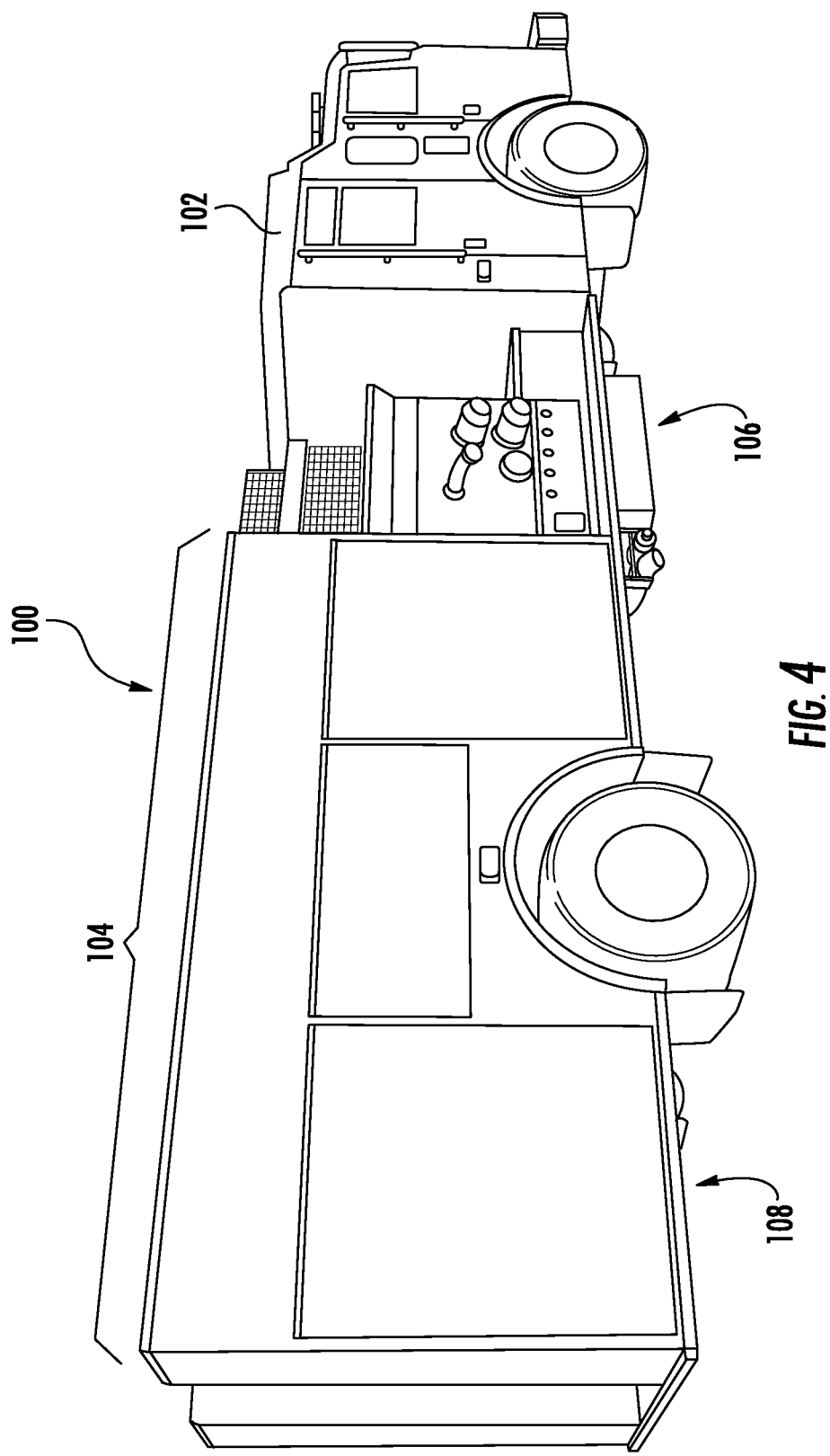
FIG. 4 is a right side isometric view of the firefighting vehicle of FIG. 3.

FIGS. 3 and 4 show a firefighting vehicle 100 that includes exhaust treatment system 10. As detailed below, firefighting vehicle 100 includes a chassis having first and second spaced apart frame rails, which are generally elongated and extend in a longitudinal direction from a fore or front location to an aft or rear location of the vehicle. As also detailed below, DPF device 16 of exhaust system 10 is supported at a first lateral side of the chassis (e.g., a passenger side, right-hand side, etc.) by one of the frame rails, while SCR device 18 of exhaust system 10 is supported at a second lateral side of the chassis opposite the first lateral side (e.g., a driver side, left-hand side, etc.) by the other frame rail. According to an exemplary embodiment, DPF device 16 and SCR device 18 are supported at substantially the same longitudinal distance along the chassis and supported at substantially the same height relative to the chassis.

Supporting the two primary treatment devices of exhaust system 10 in such a manner may provide a variety of advantages. For example, supporting DPF device 16 and SCR device 18 in such a manner the may provide increased clearance along an inner of chassis for other components of vehicle 100 (e.g., a fire pump, a drivertrain, etc.), may allow vehicle 100 to be have a shorter overall height (thereby providing lower access to hoses and/or storage compartments), may allow vehicle 100 to be built with a shorter wheelbase (thereby improving maneuverability of the vehicle) and/or may reduce the likelihood that the interior capacity of a cab of vehicle 100 will have to be reduced to accommodate the exhaust system. Supporting DPF device 16 and SCR device 18 in such a manner the may also provide improved accessibility to exhaust system 10 for maintenance and servicing.

Before discussing further details of exhaust system 10, and vehicle 100, it should be noted that references to "front," "back," "rear," "upper," "lower," "right," and "left" in this description are merely used to identify the various elements as they are oriented in the FIGURES, with "front," "back," and "rear" being relative to the direction of travel of the vehicle. These terms are not meant to limit the element which they describe, as the various elements may be oriented differently in various applications.

It should also be noted that while exhaust system 10 is shown as being used with a firefighting vehicle 100 that is configured to deliver a firefighting agent, such as water, foam and/or any other fire suppressant to an area of interest (e.g., building, environmental area, airplane, automobile, another firefighting vehicle, etc.), exhaust system 10 may be suitable for use with any vehicular application for which it would be desirable to separate the components of the exhaust system along the chassis in such a manner.

It should further be noted that for purposes of this disclosure, the term coupled means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Still referring to FIGS. 3 and 4, vehicle 100 is shown as including a cab 102 and a body portion 104 spaced rearward or behind cab 102. Cab 102 functions as an operator and/or occupant compartment for vehicle 100 by providing an enclosure or area suitable to receive an operator and/or occupant of the vehicle. Cab 102 includes controls associated with the manipulation of vehicle 100 (e.g., steering controls, throttle controls, etc.) and may optionally include controls associated with one or more auxiliary components of the vehicle 100 (e.g., foaming systems, fire pumps, aerial ladders, turrets, etc.). Cab 102 is carried or otherwise supported at a front end of vehicle 100 with at least a portion of cab 102 extending beyond the forward-most front wheel. Positioning cab 102 in this manner increases the amount of space available along the chassis of vehicle 100 for such things as fire pumps, compartmental storage of equipment, firefighting agent storage tanks, hose beds, etc.

Body portion 104 generally constitutes the portion of vehicle 100 which forms an exterior of vehicle 100 rearward of cab 102. Body portion 104 may be configured to store or otherwise support various components of vehicle 100, such as compressed air foam systems ("CAFS"), storage tanks, firefighting equipment (e.g., warning lights, hoses, nozzles, ladders, tools, etc.). According to an exemplary embodiment, body portion 104 includes a first or forward body section 106 and a second or rearward body section 108.

Forward body section 106 is configured to house or otherwise support a fire pump 110 (shown in FIG. 5) configured to pressurize and pump the firefighting agent from a firefighting agent source (e.g., tank, body of water, hydrant, etc.) so that the pressurized firefighting agent can be supplied to various fluid outlets (e.g., hose connectors, manifolds, turrets, etc.) of vehicle 100. Supported on a driver side of forward body section 106, is a fire pump control panel 112 operatively coupled to fire pump 110. Fire pump control panel 112 includes an arrangement user interfaces (e.g., levers, buttons, switches, etc.), displays and gauges configured to enable control of fire pump 110 and any other system that may need to be controlled (e.g., CAFS, etc.) and/or to monitor the control of fire pump 110 and any of the other systems. Supported on a driver side and a passenger side of forward body section 106 are one or more fluid inlet hose connectors and/or fluid outlet hose connectors operatively coupled to fire pump 110 and configured to receive a fire hose.

Rearward body section 108 is configured to house a firefighting agent storage system which comprises one or more tanks or other containers configured to store one or more firefighting agents such as water, foam, fluid chemicals, dry chemicals and the like. For example, the firefighting agent storage system may include a relatively large water tank and a smaller foam tank. Rearward body section 108 may also include compartmentalized storage for supporting equipment such as ladders, hoses, etc. According to the various alternative embodiment, rearward body section 108 may also function as a base for an articulating ladder.

Figure 5:
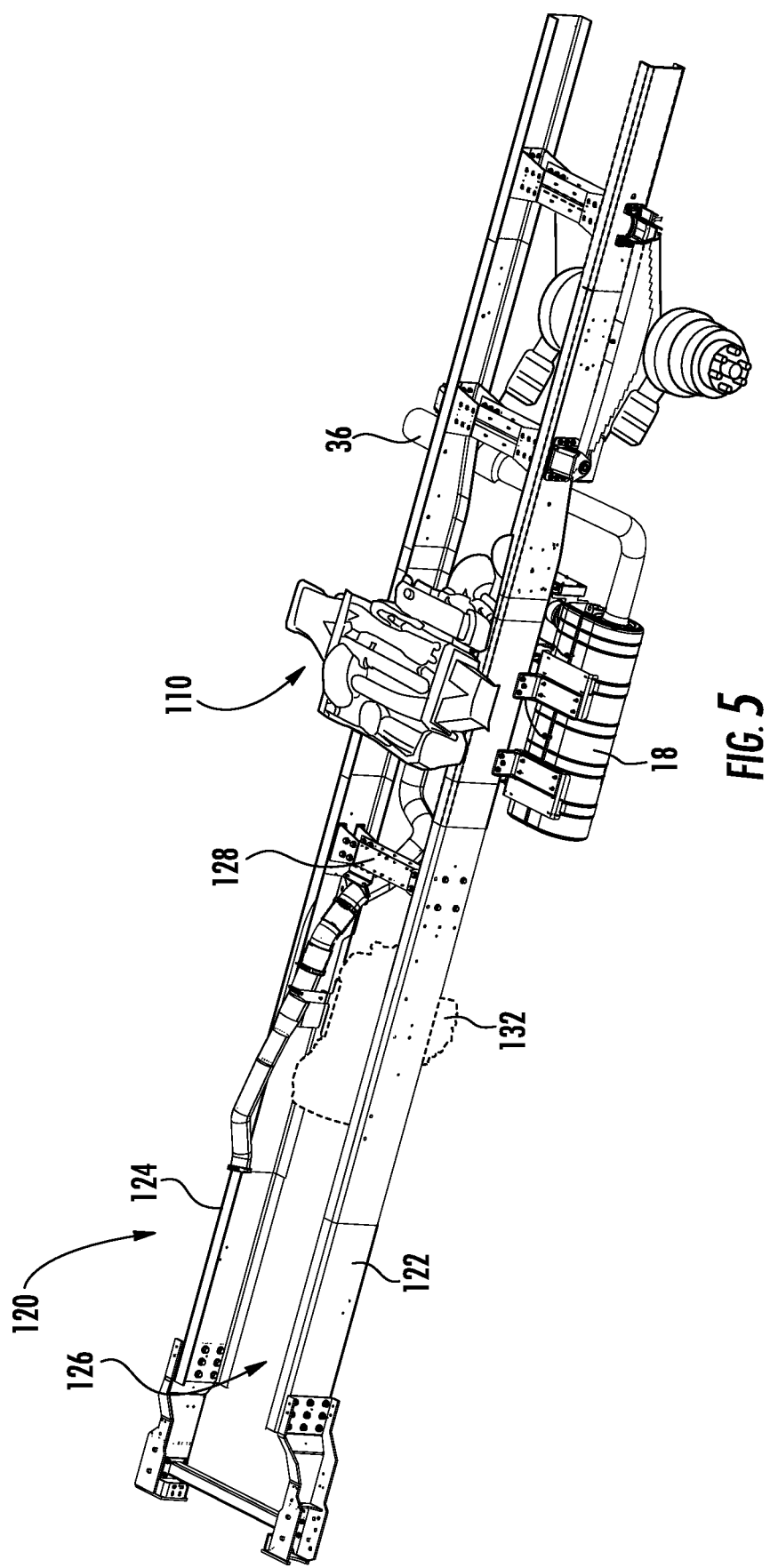
FIG. 5 is a left side isometric view of a chassis of the firefighting vehicle of FIG. 3 supporting the after treatment exhaust system of FIG. 1.

Referring to FIG. 5, vehicle 100 includes a chassis 120 to support the functional components of vehicle 100. Chassis 120 extends in a fore and aft direction an entire length of vehicle 100 along a longitudinal center line of vehicle 100 and includes one or more structures configured to serve as the base or foundation for the components of vehicle 100. According to the embodiment illustrated, chassis 120 includes a pair of parallel longitudinally extending frame members or frame rails, shown as a first frame rail 122 (e.g., left side frame member, driver side frame member, etc.), and a second frame rail 124 (e.g., right side frame member, passenger side frame member, etc.).

First frame rail 122 and second frame rail 124 are configured as elongated structural or supportive members (e.g., beams, channels, tubing, etc.). For example, according to embodiment illustrated, first frame rail 122 and second frame rail 124 are elongated beams having a substantially "C-shaped" cross section with the open portion of the "C" facing the opposing frame member. First frame rail 122 and second frame rail 124 are spaced apart from each other in a lateral (i.e., side-to-side) direction to define a void or cavity 126 that provides a space for effectively supporting or otherwise receiving certain components of vehicle 100 (e.g., fire pump 110, a drivetrain, etc.). To support first frame rail 122 and second frame rail 124 in this spaced apart manner, chassis 120 includes one or more transversally extending cross members 128. Cross members 128 are coupled between first frame rail 122 and second frame rail 124 and extend in a direction that is substantially perpendicular to first frame rail 122 and second frame rail 124.

Supported along chassis 120 is an engine, shown as a diesel engine 130, and a transmission 132. Transmission 132 is coupled to diesel engine 130 and is configured to transfer the power and mechanical energy received from diesel engine 130 to one or more wheels of vehicle 100, which in turn propel vehicle 100 in a forward or rearward (or other) direction, and/or to one or more components of vehicle 100 (e.g., a fire pump, etc.). Diesel engine 130 is supported at a front portion of vehicle 100 within cavity 126 defined by first frame rail 122 and second frame rail 124. In such a position, diesel engine 130 is substantially supported under cab 100. Transmission 132 is also supported within cavity 126 and substantially under cab 100.

During operation, diesel engine 130 generates an exhaust gas stream that includes a mixture of air pollutants. To treat such pollutants before the exhaust gas stream is discharged or otherwise released into the environment, exhaust system 10 is provided. The coupling of exhaust system 10 to diesel engine 130 is shown in FIGS. 5 through 9. As noted above, DPF device 16 and SCR device 18 are advantageously supported in a spaced-apart manner on opposite lateral sides of chassis 120. According to the embodiment illustrated, DPF device 16 is supported at second frame rail 124, while SCR device 18 is supported at first frame rail 122.

DPF device 16 and SCR device 18 are both positioned rearward of diesel engine 130 and transmission 132. According to an exemplary embodiment, DPF device 16 and SCR device 18 are positioned along second frame rail 124 and first frame rail 122 respectively so that they are substantially under forward body section 106 of body portion 104. According to the various alternative embodiments, DPF device 16 and SCR device 18 may be positioned along the chassis so that they are substantially under cab 102 or substantially under rearward body section 108 of body portion 104. To secure DPF device 16 and SCR device 18 to second frame rail 124 and first frame rail 122 respectively, one or more mounting arrangements (e.g., connectors, etc.) are provided. According to an exemplary embodiment, vehicle 100 includes a first mounting device for securing DPF device 16 to second frame rail 124 and a second mounting device for securing SCR device 18 to first frame rail 122.

Figure 6:
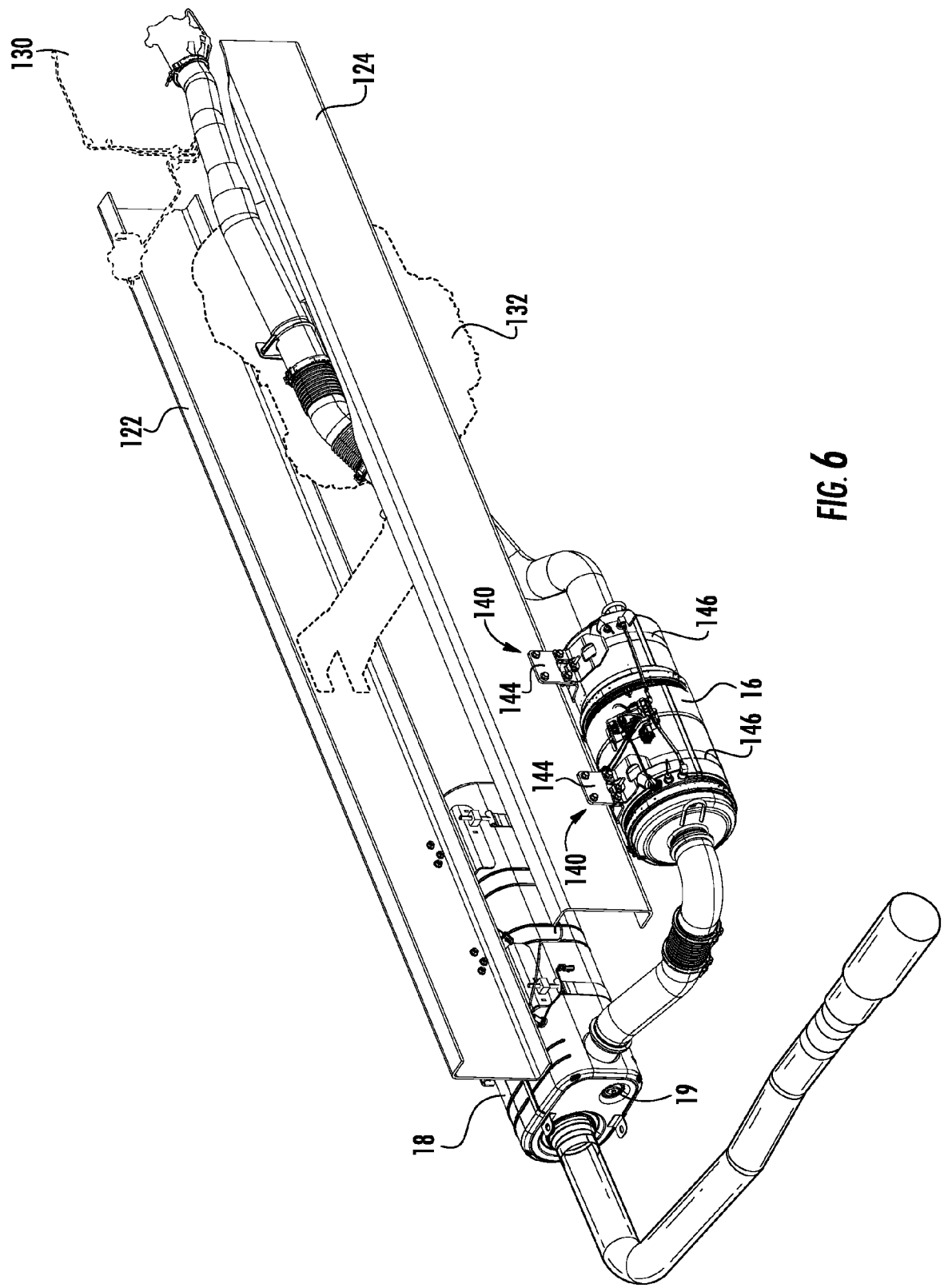
FIG. 6 is a right side isometric view of the after treatment exhaust system showing its position relative to the chassis of the firefighting vehicle.

Referring to FIG. 6, the first mounting device is shown as including a pair of mounting brackets 140 for securing DPF device 16 to second frame rail 124. Mounting brackets 140 include a first portion 144 configured to be coupled to DPF device 16 and a second portion 146 configured to be coupled to second frame rail 124. According to an exemplary embodiment, first portion 144 substantially conforms to an outer contour of DPF device 16 to ensure a secure coupling to the chassis. For example, according to the embodiment illustrated, DPF device 16 has a substantially circular cross sectional shape and first portion 144 is shown as including a strap 148 that extends around and conforms to the outer periphery of DPF device 16. According to an exemplary embodiment, second portion 146 is a substantially flat plate extending upward in a substantially vertical direction from first portion 144 that is configured to be coupled directly to an outer lateral surface of second frame rail 124. To facilitate the coupling of second portion 146 to second frame rail 124, second portion 146 may define openings configured to receive a fastener (e.g., bolts, screws, pins, rivet, etc.) that is configured to be inserted through mounting bracket 140 and second chassis rail 124.

Figure 7:
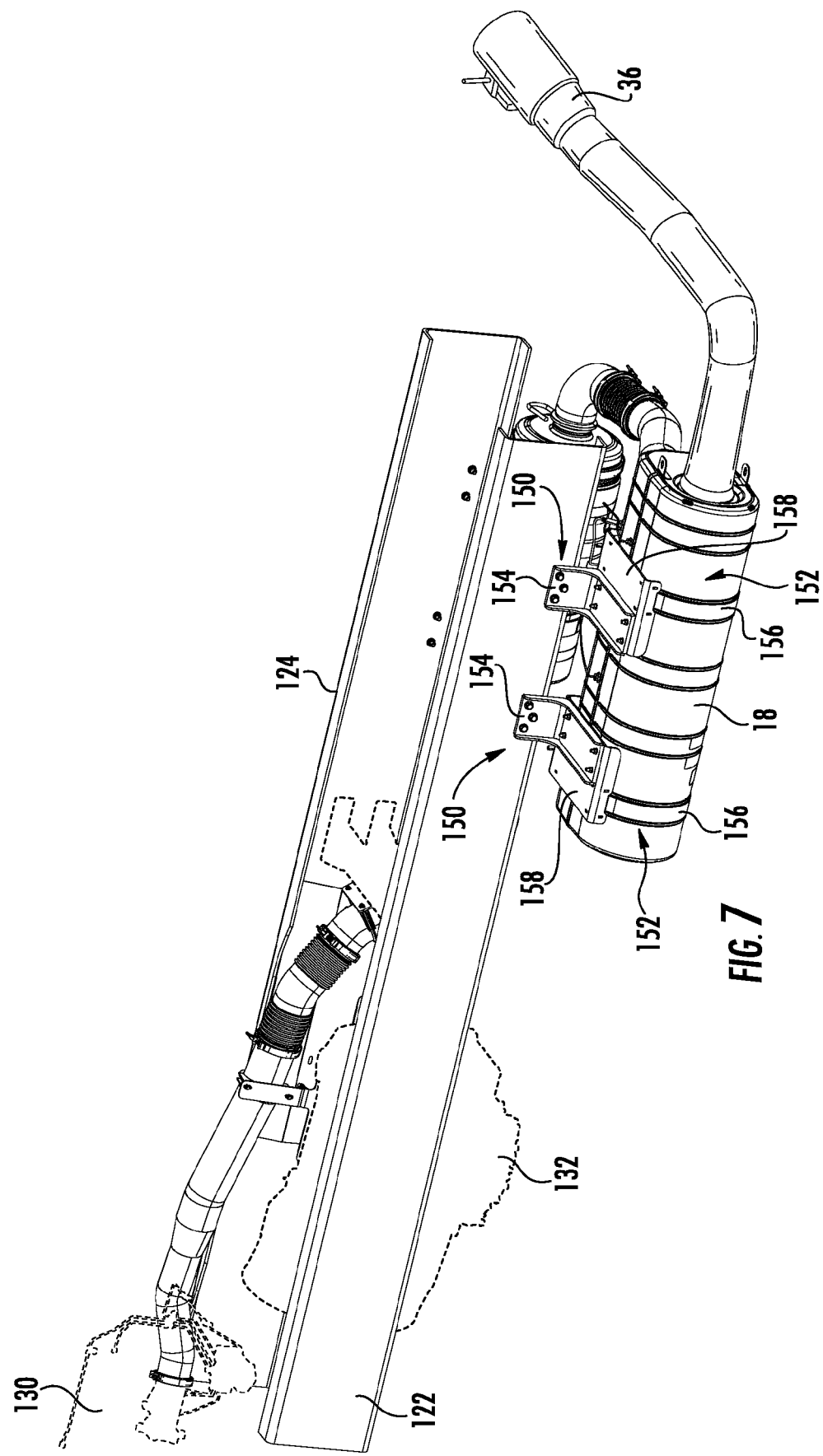
FIG. 7 is another left side isometric view of the after treatment exhaust system showing its position relative to the chassis.

Referring to FIG. 7, the second mounting device is shown as including a pair of mounting brackets 150 for securing SCR device 18 to first frame rail 122. Each mounting bracket 150 includes a first portion 152 configured to be coupled to SCR device 18 and a second portion 154 configured to be coupled to first frame rail 122. Similar to mounting brackets 140, first portion 152 of mounting bracket 152 substantially conforms to an outer contour of SCR device 18 to ensure a secure coupling to the chassis. For example, according to the embodiment illustrated, SCR device 18 has a substantially oblong cross sectional shape and first portion 150 is shown as including a strap 156 that extends around and conforms to the outer periphery of SCR device 18 and a mounting plate 158 provided at a top or upper surface of SCR device 18. According to an exemplary embodiment, second portion 154 is a substantially L-shaped member having a first portion extending outward in a substantially horizontal direction that is configured to be coupled to mounting plate 158 and a second portion extending upward in a substantially vertical direction that is configured to be coupled directly to an outer lateral surface of first frame rail 122. To facilitate the coupling of second portion 154 to first frame rail 122, second portion 154 may define openings configured to receive a fastener (e.g., bolts, screws, pins, rivet, etc.) that is configured to be inserted through mounting bracket 150 and first chassis rail 122.

Figure 8:
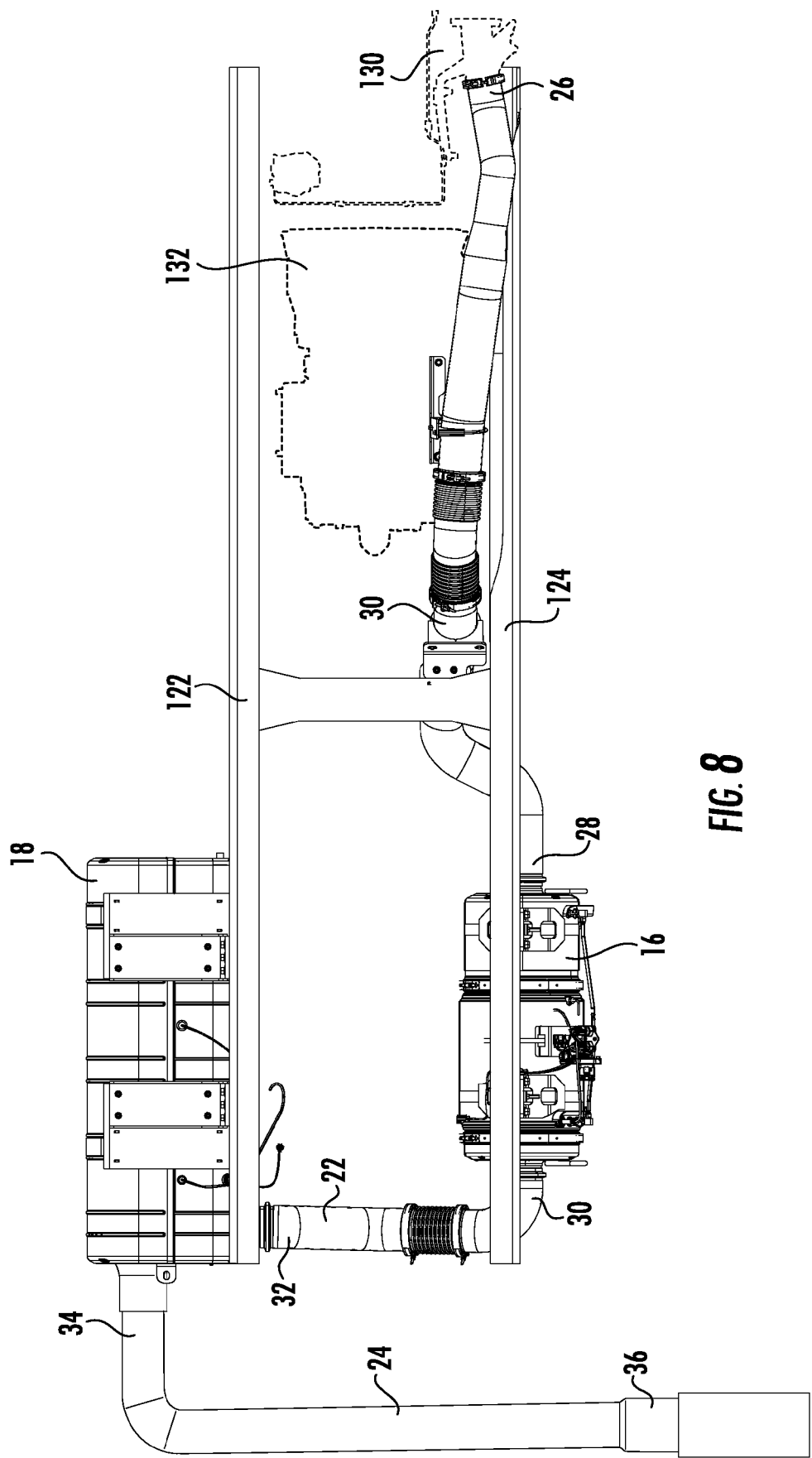
FIG. 8 is a top plan view of the after treatment exhaust system showing its position relative to the chassis.
Figure 9:
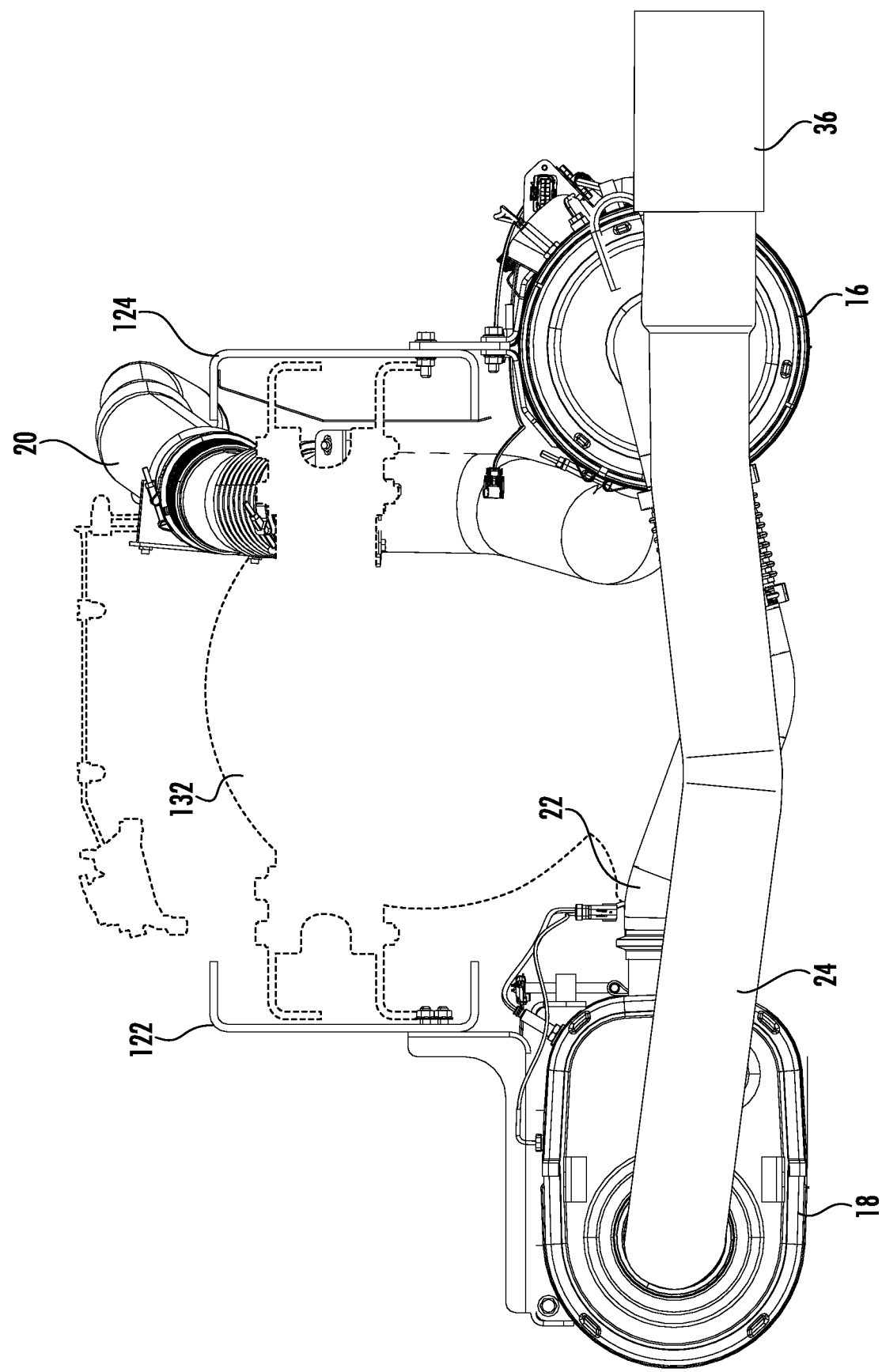
FIG. 9 is a rear elevation view of the after treatment exhaust system showing its position relative to the chassis.

Referring to FIGS. 8 and 9, mounting brackets 140 and 150 support DPF device 16 and SCR device 18 along chassis 120 in a manner that leaves cavity 126 relatively free and clear of the exhaust treatment devices of exhaust system 10. For example, as shown in FIG. 8, a substantial portion of DPF device 16 and SCR device 18 are located to the outside of second frame rail 124 and first frame rail 122. Also, as shown in FIG. 9, the exhaust treatment devices are supported at heights that are at least partially below a bottom surface of chassis 120.

To facilitate the movement of the exhaust gas stream from diesel engine 130 through exhaust system 10, first conduit 20, second conduit 22 and third conduit 24 are provided. Referring to FIG. 8, and according to the embodiment illustrated, first end 26 of first conduit 20 is shown as being coupled to a rear portion of diesel engine 130. First conduit 20 is then shown as extending a rearward direction that is substantially parallel to a longitudinal axis of vehicle 100 and along a path that is substantially adjacent to second frame rail 124. A front portion of first conduit 20 is shown as being at a height that is above second frame rail 124 to provide clearance around diesel engine 130 and transmission 132. After first conduit 20 passes transmission 132, first conduit 20 drops to a height that is lower than cross support member and second frame rail 124 so that second end 28 of first conduit 20 can be coupled to the inlet of DPF device 16. The inlet of DPF device 16 is shown as being provided in a forwardly facing end wall of the device.

Still referring to FIG. 8, first end 30 of second conduit 22 is coupled to the outlet of DPF device 16, which is shown as being provided in a rearwardly facing end wall of the device. After extending rearward from the outlet of DPF device 16, second conduit 22 makes an appropriately ninety degree turn inward towards SCR device 18. After making the turn, second conduit 22 extends toward SCR device 18 in a direction that is substantially perpendicular to the longitudinal axis of vehicle 100 and first conduit 20. According to an exemplary embodiment, second conduit 22 extends under first frame rail 122 and second frame rail 124 as is it travels between DPF device 16 and SCR device 18. Referring to FIG. 9, as second conduit 22 extends laterally under second frame rail 124 and first frame rail 122, second conduit 22 curves downward at substantially a centerline of vehicle 10 to provide additional clearance within cavity 126 (e.g., to provide clearance for a drive shaft, etc.). According to an exemplary embodiment, second conduit 22 is welded together as a one-piece pipe that extends between first end 30 and second end 32. In such an embodiment, a flexible section (e.g., having a baffle configuration, etc.), provided just to the side of the centerline portion that curves downward, is welded to the pipe to form the one-piece member. Such an embodiment may eliminate the need to use a fastening device, such as a clamp, to secure sections of the pipe and/or the flexible section to each other. As noted above, second conduit 22 may be formed of any number of sections, and may be provided as separate pieces and/or an integrally formed one-piece member.

Referring back to FIG. 6, the inlet of SCR device 18 is shown as being provided at an inwardly facing side wall of the device. The inlet is also shown as being provided towards a back end of SCR device 18. Such positioning may advantageously allow second conduit 22 to have a relatively straight route for coupling second end 32 of second conduit 22 to the inlet of SCR device 18. Referring back to FIG. 8, first end 34 of third conduit 24 is coupled to the outlet of SCR device 18, which is shown as being provided in a rearwardly facing end wall of the device. After extending rearward from the outlet of SCR device 18, third conduit 24 makes an appropriately ninety degree turn inward back towards the centerline of vehicle 100. After making the turn, third conduit 24 extends toward an opposite side of vehicle 100 in a direction that is substantially perpendicular to the longitudinal axis of vehicle 100 and parallel to second conduit 22.

According to an exemplary embodiment, third conduit 24 extends under first frame rail 122 and second frame rail 124 after leaving device 18. Provided at second end 36 of third conduit 24 is a tail pipe that is open to the environment. Referring to FIG. 8, third conduit 24 is spaced apart from second conduit 22 in a rearward direction a distance that is sufficient to position the tail pipe rearward of front body section 106. Such a configuration may advantageously position the potentially hot tail pipe away from an area where a firefighter is likely to be standing when connecting and/or disconnecting one or more fire hoses.

According to the various alternative embodiments, exhaust system 10 may include more than one exhaust outlet for emitting the exhaust gas into the environment. For example, third conduit 24 may define a second exhaust flow path that extends from third conduit 24 upwards in a substantially vertical direction. In such an embodiment, a first tail pipe would be provided at second end 36, while a second tail pipe would be provided at the end of the upwardly extending portion. According to an exemplary embodiment, this second tail pipe portion would extend above cab 102 and/or body portion 104 so that the exhaust stream can emitted above vehicle 100 (e.g., by extending upwards behind the cab, etc.). According to still further alternative embodiments, third conduit 24 may only include a vertically extending tail pipe and the horizontally extending tail pipe may be eliminated. According to still further alternative embodiments, third conduit 24 may be configured to provide a tail pipe open to the environment of a driver side of the vehicle.

In operation, the exhaust gas exiting diesel engine 130 passes through first conduit 20 along a pathway that is substantially parallel to a longitudinal axis of vehicle 100 and into DPF device 16. Once the exhaust gas enters DPF device 16, the exhaust gas may be divided into any of a number of exhaust gas flow paths for passing through any of a number of filters within DPF device 16. While only a single diesel particulate filter is shown, additional diesel particulate filters can be added to the exhaust system (e.g., in parallel with DPF device 16, in series with DPF device 16, etc.) depending on the application. In DPF device 16, particulates are removed from the exhaust gas.

After passing through DPF device 16, the exhaust gas passes through second conduit 22 along a pathway that is substantially perpendicular to the longitudinal axis of vehicle 100 and into SCR device 18. Once the exhaust gas enters SCR device 18, the exhaust gas may again be divided into any of a number of exhaust gas flow paths for passing through one or more treatment sections of SCR device 18. For example, the exhaust gas may flow in one or more flow paths that extend in a lengthwise direction of SCR device 18. According to an exemplary embodiment, a reductant is added to the exhaust gas before the exhaust gas passes through the functional portion or treatment sections of SCR device 18. One possible reductant is an urea. When a mixture of the reductant and the exhaust gas pass through SCR device 18, nitrous oxide in the exhaust gas is converted into nitrogen and water vapor. According to the embodiment illustrated, reductant is configured to be injected or otherwise added to the exhaust gas through an inlet 19 (shown in FIG. 6). An injector for adding the reductant is preferably supported near inlet 19, while a tank for retaining the reductant and/or a pump for transferring the reductant from the tank to the injector may be supported anywhere along the vehicle (e.g., such as supporting the tank in a driver side fender panel behind a rear axle of the vehicle, etc.). According to the various alternative embodiments, the reductant may be added anywhere along second conduit 22.

It is important to note that the construction and arrangement of the elements of exhaust system 10 and/or vehicle 100 as shown in the exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the components of the exhaust system may be constructed from any of a wide variety of materials that provide sufficient functionality and/or strength or durability. For example, the SCR device may include an interior formed of a ceramic material. Accordingly, all such modifications are intended to be included within the scope of the present inventions. Other substitutions, modifications, changes and omissions may be made in the design, operating conditions and arrangement of the preferred and other exemplary embodiments without departing from the spirit of the appended claims.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the appended claims.

What is claimed is:

1. A firefighting vehicle comprising:
a chassis including a first frame rail and a second frame rail, the first frame rail and the second frame rail being spaced apart from each other in a lateral direction to provide a cavity;
an engine supported at least partially within the cavity;
an exhaust system coupled to the engine, the exhaust system comprising a diesel particulate filter having a first end and a second end both supported along the first frame rail and a selective catalytic reduction device having a first end and a second end both supported along the second frame rail; and
a fire pump supported at the chassis at least partially between the diesel particulate filter and the selective catalytic reduction device.

2. The firefighting vehicle of claim 1 wherein the first frame rail is provided on a passenger side of the vehicle and the second frame rail is provided on a driver side of the vehicle.

3. The firefighting vehicle of claim 1 further comprising a first bracket for coupling the diesel particulate filter to the first frame rail and a second bracket for coupling the selective catalytic reduction device to the second frame rail, the first bracket supporting the diesel particulate filter at a position that is at least partially outside of an outer surface of the first frame rail and below a bottom surface of the first frame rail, the second bracket supporting the selective catalytic reduction device at a position that is at least partially outside of an outer surface of the second frame rail and below a bottom surface of the second frame rail.

4. The firefighting vehicle of claim 1 further comprising a a housing enclosing the fire pump, the housing supporting a fire pump control panel facing on a first lateral side of the vehicle and at least one hose connector on an opposite second lateral side of the vehicle.

5. The firefighting vehicle of claim 4 wherein the exhaust system further comprises an exhaust outlet provided at the second lateral side of the vehicle rearward of the at least one hose connector.

6. The firefighting vehicle of claim 1 wherein the exhaust system further comprises a first conduit coupled between the engine and the diesel particulate filter, a second conduit coupled between the diesel particulate filter and the selective catalytic reduction device and a third conduit having a first end coupled to the selective catalytic reduction device and at least one second end open to the environment.

7. The firefighting vehicle of claim 6 wherein the third conduit extends across the chassis in a horizontal orientation to provide an exhaust outlet on a side of the chassis opposite the selective catalytic reduction device.

8. The firefighting vehicle of claim 6 wherein the second conduit has a central region that curves downward to provide additional clearance along the cavity.

9. A vehicle, comprising:
an engine;
a chassis; and
an exhaust system, including:
a diesel particulate filter having a first end and a second end both supported along a first lateral side of the chassis;
a selective catalytic reduction device having a first end and a second end both supported along a second lateral side of the chassis opposite the first lateral side, wherein the diesel particulate filter and the selective catalytic reduction device are supported at the same height relative to the chassis;
a first conduit coupled between the engine and the diesel particulate filter;
a second conduit coupled between the diesel particulate filter and the selective catalytic reduction device; and
a third conduit having a first end coupled to the selective catalytic reduction device and at least one second end open to the environment.

10. The exhaust system of claim 9 wherein the third conduit extends across the chassis for providing an exhaust outlet at the first lateral side of the chassis.

11. The exhaust system of claim 10 wherein the second conduit extends in a horizontal direction that is parallel to the third conduit.

12. The exhaust system of claim 11 wherein the second conduit has a central region that curves downward to provide additional clearance along the vehicle chassis.

13. A vehicle comprising:
a chassis having a longitudinal direction, the chassis including a first frame member and a second frame member;
an engine coupled to the chassis, wherein the first frame member and the second frame member are spaced apart from each other in a lateral direction to provide a cavity that receives the engine; and
an exhaust system supported at the engine, the exhaust system comprising a diesel particulate filter coupled to the first frame member with a first bracket and having a first end and a second end both supported at a first lateral side of the chassis such that the diesel particulate filter is positioned along the longitudinal direction of the chassis, a selective catalytic reduction device coupled to the second frame member with a second bracket and having a first end and a second end both supported at a second lateral side of the chassis opposite the first lateral side such that the selective catalytic reduction device is positioned along the longitudinal direction of the chassis, a first conduit coupled between the engine and the diesel particulate filter, a second conduit coupled between the diesel particulate filter and the selective catalytic reduction device and a third conduit having a first end coupled to the selective catalytic reduction device and at least one second end open to the environment,
wherein the first bracket supports the diesel particulate filter at a position that is at least partially outside of an outer surface of the first frame member and below a bottom surface of the first frame member.

14. The vehicle of claim 13 wherein the third conduit extends across the chassis for providing an exhaust outlet at the first lateral side of the chassis.

15. The vehicle of claim 13 wherein the second bracket supports the selective catalytic reduction device at a position that is at least partially outside of an outer surface of the second frame member and below a bottom surface of the second frame member.

* * * * *